United States Patent
Wietlisbach et al.

(10) Patent No.: US 7,945,910 B2
(45) Date of Patent: May 17, 2011

(54) DYNAMIC REGISTRATION OF BATCH FILES BY ABSTRACT SELECTION CRITERIA

(75) Inventors: Markus Wietlisbach, Zollikerberg (CH); Hansbeat Loacker, Egg (CH)

(73) Assignee: UBS AG, Zurich (CH)

( * ) Notice: Subject to any disclaimer, the term of this patent is extended or adjusted under 35 U.S.C. 154(b) by 1360 days.

(21) Appl. No.: 11/281,432

(22) Filed: Nov. 18, 2005

(65) Prior Publication Data

US 2006/0294521 A1    Dec. 28, 2006

(30) Foreign Application Priority Data

Jun. 8, 2005    (EP) .................................... 05012372

(51) Int. Cl.
G06F 9/46    (2006.01)
(52) U.S. Cl. ...................................................... 718/101
(58) Field of Classification Search .................. 718/101; 707/643; 717/162, 166
See application file for complete search history.

(56) References Cited

U.S. PATENT DOCUMENTS

| | | | | |
|---|---|---|---|---|
| 4,104,718 | A * | 8/1978 | Poublan et al. ........................ | 1/1 |
| 5,404,528 | A | 4/1995 | Mahajan ........................ | 395/650 |
| 5,471,615 | A * | 11/1995 | Amatsu et al. ................. | 709/202 |
| 5,878,410 | A * | 3/1999 | Zbikowski et al. ............... | 707/2 |
| 6,055,368 | A * | 4/2000 | Kunioka ......................... | 703/13 |
| 6,131,190 | A | 10/2000 | Sidwell ............................. | 717/9 |
| 6,631,477 | B1 * | 10/2003 | LeCrone et al. .................. | 714/5 |
| 6,886,160 | B1 * | 4/2005 | Lee ................................ | 717/173 |
| 7,353,514 | B1 * | 4/2008 | Camp et al. ..................... | 718/101 |
| 2002/0026631 | A1 * | 2/2002 | Barritz ........................... | 717/127 |
| 2002/0169780 | A1 * | 11/2002 | Mraz ............................... | 707/100 |
| 2003/0163511 | A1 * | 8/2003 | Smith et al. .................... | 709/101 |
| 2004/0181792 | A1 * | 9/2004 | Barajas .......................... | 718/101 |

OTHER PUBLICATIONS

Teuffel, Michael TSO: Time Sharing Option im Betriebssystem MVS—das Lehr—und Handbuch fur den erfolgreichen TSO-Benutzer, 3. Auflage, Munich, Oldenbourg, 1989.
"LoadPlus for DB2 Reference Manual" BMC Software, [Online] May 2005, XP002357796 Gefunded im Internet: URL:http://documents.bmc.com/supportu/documents/43/25/54325/54325.pdf [gefunded am Dec. 7, 2005].
Bourne S R: "UNIX Time-Sharing System: The UNIX Shell" Bell System Technical Journal, AT and T, Short Hills, NY, US Bd. 57, Nr. 6 Part 2, Jul. 1, 1978, Seiten 1971-1990, XP002025448.
Yokota M: Information Sharing Based on Shaped Object Model NEC Research and Development, Nippon Electric LTD., Tokyo, JP, Bd. 37, Nr. 4, Oct. 1996, Seiten 517-527, XP000685765.
International Search Report Dated Sep. 6, 2006.

* cited by examiner

*Primary Examiner* — Meng-Ai An
*Assistant Examiner* — Brian Chew (57) ABSTRACT

To detect files which are generated unnecessarily or no longer required, and for reliable file versioning, in a batch-processing-oriented environment, a dynamic batch processing system is proposed. The system includes a batch processing control component to process batch processing control instructions, which include the call of at least one program, and a database with files, each of which has a physical file name. The system also includes a component to provide program-related file definition information, which defines the files which are required for a program run by abstract selection criteria. In a file register, the physical file names of the files which are created for the program runs are registered in the form of register entries, which associate at least one selection attribute with each physical file name. A service component which communicates with the control component has access to the file register and the file definition component. The service component selects and/or creates register entries on the basis of file definition information which is associated with the program to be called.

20 Claims, 7 Drawing Sheets

```
FDF PRG-PROC70982
File type designation: my_inputdata
File option: present
Versions: of this week
Processing unit: X File type designation: my_outputdata
File option: create new
Versions: for today                    24
Processing unit: X
```

Fig. 6

```
File type designation: my_inputdata
File option: present
Versions: 11.12.2004, 12.12.2004
Processing unit: 03

File type designation: my_outputdata
File option: create new
Versions: 13.12.2004                   34
Processing unit: 03
```

Fig. 7

| File type designation | on date | Proc. unit | Status | Physical name |
|---|---|---|---|---|
| my_inputdata | 11.12.2004 | 03 | active | P01.F3.DDT.X3 |
| my_inputdata | 12.12.2004 | 03 | active | P01.F3.DDT.X4 |
| my_inputdata | 13.12.2004 | 01 | read | P01.F3.DDT.Y4 |
| my_outputdata | 12.12.2004 | 02 | inactive | P01.K2.DDT.K2 |

Fig. 8

| File type designation | on date | Proc. unit | Status | Physical name |
|---|---|---|---|---|
| my_inputdata | 11.12.2004 | 03 | read | P01.F3.DDT.X3 |
| my_inputdata | 12.12.2004 | 03 | read | P01.F3.DDT.X4 |
| my_inputdata | 13.12.2004 | 01 | read | P01.F3.DDT.Y4 |
| my_outputdata | 12.12.2004 | 02 | inactive | P01.K2.DDT.K2 |
| my_outputdata | 13.12.2004 | 03 | active | P01.K2.DDT.K3 |

Fig. 9

DYNAMIC REGISTRATION OF BATCH FILES BY ABSTRACT SELECTION CRITERIA

FIELD OF THE INVENTION

The invention relates to the field of batch processing. More specifically, the invention relates to the registration of files which are required in batch processing runs.

BACKGROUND OF THE INVENTION

Batch processing is a way of operating electronic computers, and goes back to the time of punched cards. Batch processing is generally understood to be the processing of a series of batch jobs. Each individual batch job is usually provided with all necessary programs, data and instructions, so that it can be completely executed without any interaction by a user.

Batch jobs are defined in a control language, which is generally called JCL (Job Control Language). By means of such a control language, on the one hand execution of batch jobs can be fully planned in advance, so that they can run in the background without any interaction. On the other hand, near-system or physical data (file names, addresses of output devices, etc.) can be isolated from the running program and displaced into JCL control instructions. In this way, above all those processes which require hours or days of computing time can be flexibly planned. Such computation-intensive processes are typical for periodically occurring batch processing runs such as day end or year end processing in banks and other large companies.

Batch-processing-based operating systems often have special system components for controlling and monitoring the running of batch processing runs. These system components read the JCL control instructions and interpret them. The MVS (Multiple Virtual Storage) operating system, for instance, uses JES (Job Entry Subsystem) to read and interpret the JCL control instructions.

Today, many operating systems—in some cases through additional components—offer additional operating modes as well as batch processing, such as interactive processing or real time (online) processing. The MVS operating system for example, which is based on batch processing, becomes capable of real time processing with the addition of CICS (Customer Information Control System). The addition of TSO (Time Sharing Option) extends MVS with interactive processing. An overview of TSO, JCL and JES is given in Teuffel, Michael, TSO: Time Sharing Option im Betriebssystem MVS—das Lehr-und Handbuch für den erfolgreichen TSO-Benutzer (TSO: Time Sharing Option in the MVS operating system—the textbook and manual for the successful TSO user), 3rd edition, Munich, Oldenbourg, 1989.

As already indicated, JCL control instructions usually include near-system or physical information, and link it to the program-specific data. For instance, if a program contains a generic designation, chosen by the programmer, for a file type, in the JCL control instruction there is a reference to the file (data set) which is stored in the system, and which should be associated with the generic file designation when the program runs. In MVS/TSO, this reference is made by a JCL control instruction such as //my_inputdata DD DSN=ed1.input.data my_inputdata here stands for the generic designation which the programmer has chosen for a file type which the program uses, and ed1.input.data, in the example, stands for the physical name of a stored file which the program is to process. On the basis of a database catalogue, which associates the physical file name with its physical storage location (disk name, track address, etc.), during the processing of the JCL control instructions the necessary physical files can be identified, the required temporary storage areas can be reserved and the desired files can be read. The same applies if files are written.

Despite the above-mentioned advantages of batch processing, particularly in the case of computation-expensive and periodically occurring computing processes, the range of functions which have been available until now is insufficient. Thus, in many batch-processing-based operating systems, it is necessary to generate all the files which a program requires before the program starts. In practice, it has been shown that often too many empty files are generated in advance. However, unnecessary empty files are difficult to identify and are often not deleted again after the end of a batch processing run. For this reason, in traditional batch processing systems, much storage space is unnecessarily occupied by empty files which could actually be deleted. The same applies to files which were accessed in the past, but are no longer required in future program runs.

A further disadvantage of traditional batch processing mechanisms is that in the JCL control instructions the physical file names (e.g. those of the files to be written) must be fixedly allocated. In turn, a fixed physical storage space must be associated with each file name in the database catalogue. In the case of repeatedly run batch processing runs, the effect of this rigid structure is that a file to be addressed by the program is constantly overwritten, because of the fixedly allocated physical file name. Therefore, for a long time no satisfactory versioning of files was possible, i.e. different versions of a specified file type could not be created. (At least not at acceptable cost. For instance, in many cases constant allocation of new physical file names in the JCL control instructions was ruled out, because these control instructions would then have had to be changed manually before each batch processing run.)

To make simpler versioning of files possible, it was proposed that file names should be allocated dynamically at operating system level by means of Generation Data Groups (GDGs). According to this approach, in the JCL control data there is only a group name. The operating system generates a new file (data set) of a specified group only during a batch processing run.

However, the use of GDGs is unsuitable for many applications, because it is only possible to address individual files of a GDG relatively, by referring to their position in a file stack (e.g. as the "last file but one" or "seventh file" in the stack). Understandably, this makes programming difficult, and in particular it makes reading instructions difficult for a human user. Additionally, in the case of program crashes a restart is critical, because meanwhile new files may have been added to the stack or old files may have been deleted. In such cases, the relative stack position of a particular file has also changed, so that in subsequent processing the wrong file is read, deleted, overwritten, etc.

The invention is based on the object of giving an improved mechanism for dynamic management of files in a batch-processing-oriented environment. The mechanism should be suitable for simplifying file housekeeping (e.g. recognising and dealing with files which are no longer required). Also, the mechanism should allow reliable file versioning.

SUMMARY OF THE INVENTION

According to a first aspect of the invention, this object is achieved by a batch processing method which includes the following steps: providing batch processing control instructions which include the call of at least one program; providing files which each have a physical file name, the files being accessed during batch processing runs; providing program-related file definition information, which defines, by abstract selection criteria, the files which are accessed (or at least expected to be accessed) during a program run; providing a file register to register the physical file names of files which are created for program runs in register entries, which assign at least one selection attribute to each physical file name; and selecting and/or creating register entries based on the file definition information which is associated with the program to be called.

Following the selection of register entries, the physical file names which are included in the selected register entries (and other register information if required) can be passed from the file register to a component which analyses this information and initiates further steps. This component can be a service component (e.g. resident in the batch processing environment). According to a possible version of this approach, the information which is included in the selected register entries (e.g. the physical file names) is passed from the file register to the service component, which prepares a run time environment for the program to be called on the basis of this information. The preparation of the run time environment can include the reservation of storage space or the preparation (e.g. opening) of paths which the program requires. Programs here are generally understood to be system or application programs, but also, for instance, procedures of batch processing control instructions (e.g. system-defined JCL procedures such as a sorting algorithm or a compiler call).

The selection and/or creation of register entries can be preceded by concretisation of the abstract selection criteria which are included in the file definition information. The abstract selection criteria can be concretised on the basis of at least one parameter, which is handed over at the start of a batch processing run (e.g. to a batch processing control component such as JES). A batch processing run can be started, and the at least one concretising parameter can be handed over, by means of a run control component (scheduler). The run control component is preferably in communication with the service component. The service component or a component of the file register (or of the batch processing control component) can then, based on the at least one parameter which has been handed over, concretise the at least one abstract selection criterion. Based on the at least one concretised selection criterion, register entries in the file register are selected and/or created. The creation of register entries can take place separately from the selection process. It is thus conceivable to create the new register entries only after the program run (whereas the corresponding files and paths to these files are created before the program run). Additionally, after the program run, the selected register entries can be updated.

According to a first variant, the file definition information is given directly in the batch processing control instructions. According to a second variant, the file definition information is held separately from the control instructions. In the case of the second variant, for instance the file definition information can be contained in a separate file (for each program to be called, a separate file containing the file definition information can be created). The file which contains the file definition information, and is associated with a particular program, can be defined in the batch processing control instructions. Such a definition can include giving the physical file name of this file.

The abstract selection criteria which are included in the file definition information can refer to non-physical parameters. Such non-physical parameters include, for instance, non-physical file names (such as a file type which is allocated by the programmer and addressed in the program). Additionally or alternatively, the abstract selection criteria can define the files which are to be selected in the file register, and/or to be newly created, abstractly in other ways (i.e. not directly). For instance, generally held file version and/or file status criteria can be included in the file definition information as abstract selection criteria. For instance, a generally held file version criterion indicates an indefinite period or instant (e.g. "this week" or "today"), in which the files to be selected were generated or updated.

Advantageously, the control instructions are not only free of file definition information, but in the case of an application program to be called, also free of assignments of physical file names for the files which are required when the application program runs. Both these facts and the provision of the file register are helpful in association with the implementation of a mechanism for file versioning.

In the register entries of the file register, at least one selection attribute is associated with each physical file name. On the basis of the selection attributes in the register entries and the determined selection criteria, the register entries to be selected and/or created are determined. According to a first variant, the at least one selection attribute includes a file version attribute. The file version attribute can be chosen so that it makes it possible to distinguish different versions of a file type which is defined in the program code. For instance, the file version attribute is a time stamp or continuous numbering.

According to a further variant, the at least one selection attribute indicates a program-specific file type designation. Such a selection attribute makes program-related selection and/or program-related creation of register entries (with physical file names included in them) possible.

According to a third variant, the at least one selection attribute includes a file status attribute. By means of the file status attribute, the activity status of a file can be identified. The file status attribute can be a binary parameter (active/inactive) or a parameter with more than two states. Using the file status attribute, advantageous functions such as finding empty files which are no longer required or status-dependent file selection can be implemented in the context of batch processing runs.

The selection attributes, and particularly the file status attribute, of a file which is accessed during a program run can be allocated or updated after the program ends, for the next batch processing event. Thus a newly created and written file can receive a first activity status. On the other hand, a previously created file which is read during a program run can receive a second activity status which is different from the first activity status. In this way it is possible, based on the file status attribute (e.g. in the case of the second activity status) to carry out file housekeeping, which can include deleting and/or archiving files. Additionally, as part of file housekeeping, a retention period can be defined and monitored.

Usefully, for a file which is newly created before the program run but not used during the program run (an empty file), a register entry is not created at all. In this case, unnecessarily generated files can be reliably detected, for instance by periodic comparisons of the files which are registered in the file register with the files which actually exist, and deleted if required.

In the case of deletion of a file which is no longer required (e.g. read or inactive), the corresponding register entry in the file register can also be deleted (and vice versa). In the same way, when a new file is written, a corresponding register entry can be generated in the file register. Usefully, when a new register entry is created, the associated selection attributes can be entered directly, and linked with the physical file name in the register entry in this way.

The invention can be implemented as software, as hardware or as a combination of hardware and software. In one example, the invention can be implemented as computer executable instructions that are stored on a non-transitory computer readable medium. The non-transitory computer-readable medium could be implemented as random access memory (RAM) (volatile or non-volatile), a DVD-ROM, CD-ROM, etc. However, the non-transitory computer readable medium cannot be implemented as a pure electromagnetic wave.

According to a hardware aspect, the invention provides a batch processing system. The batch processing system according to the invention includes: a batch processing control component to process batch processing control instructions, which include the call of at least one program; a storage component (e.g. a database) with files, each of which has a physical file name and which are accessed during batch processing runs; a file definition component to provide program-related file definition information, which defines the files which are required for a program run by abstract selection criteria; a file register to register the physical file names of the files which are created for program runs, at least one selection attribute being associated with each physical file name in the register entries of the file register; and a run time component which communicates with the batch processing control component, and which has access to the file register and the file definition component, the service component initiating selection and/or creation of register entries on the basis of file definition information which is associated with the program to be called.

The physical file names which are included in the selected and/or newly created register entries can be accessible to the service component. On the basis of the selected and/or newly created register entries, the service component can thus prepare the run time environment for the program to be called.

The batch processing system can also include a run control component to start the batch processing runs and to hand over at least one parameter, which concretises abstract selection criteria which are included in the file definition information. The service component can be in a form to initiate the selection and/or creation of register entries on the basis of the concretised selection criteria.

The batch processing system can also include a database catalogue, in which a physical storage location is associated with each physical file name. The database catalogue may be provided in addition to the file register.

Associating a file management component with the batch processing system is also conceivable. The file management component can carry out tasks such as creating empty files and opening paths to selected or newly created files.

BRIEF DESCRIPTION OF THE DRAWINGS

Further advantages and details of the invention are given in the following description of preferred embodiments and in the figures.

DESCRIPTION OF PREFERRED EMBODIMENTS

In the following, various embodiments of the invention are explained as examples for a batch processing environment, which is based on the MVS operating system and the interactive component TSO which is provided for it. Self-evidently, the invention could also be implemented in other batch-processing-oriented operating systems such as VMS or UNIX.

Figure 1:
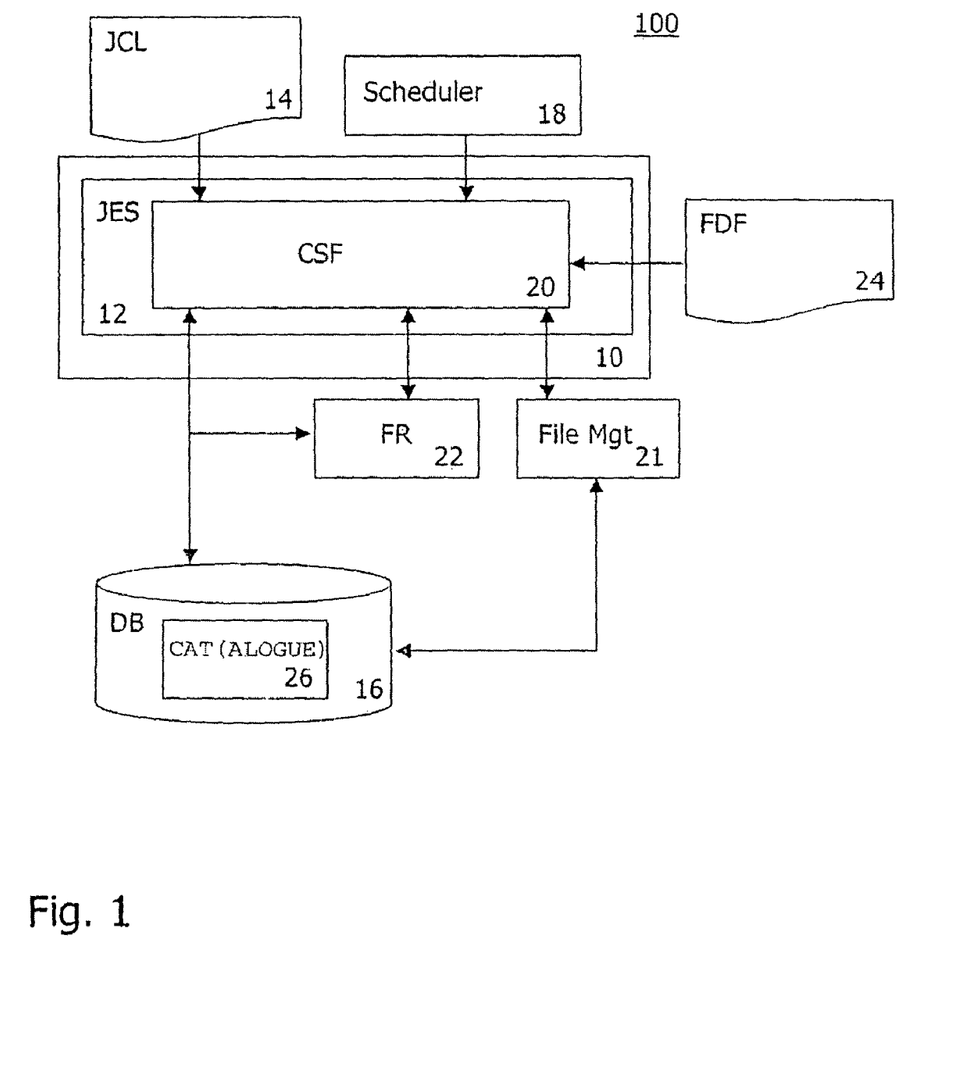
FIG. 1 shows a schematic representation of a batch processing system according to this invention.

FIG. 1 shows a schematic representation of the essential components of an exemplary batch processing system 100. The system 100 includes, as its core element, a batch processing environment 10 which is provided by the MVS operating system. A batch processing control component 12 (JES) forms an essential part of the batch processing environment 10. The control component 12 is in a form to process batch processing control instructions 14 (JCL), which in the embodiment are prepared outside the batch processing environment 10.

Generally, the control instructions 14 are created in the form of multiple records (JCL records) and stored as a file (data set) in a system database (e.g. the database 16 which is shown in FIG. 1). At least one of the JCL records (EXEC record) which are included in the control instructions 14 defines a program (e.g. an application program) which is to be called and executed in a batch processing run. At least one other of the JCL records (DD record) which are included in the control instructions 14 defines the physical file name of a file which is explained in more detail below, and which is required in the batch processing environment 10. However, the physical file names of the files which are required by the program which is indicated in the EXEC record are not included in the control instructions.

Outside the run time environment 10, a run control component 18 (scheduler), which communicates with the control component 12, is provided. The run control component 18 defines the temporal and logical sequence of batch processing runs, and is also responsible for starting the individual batch processing runs. The batch processing runs can also be started manually, e.g. by entering the TSO command SUBMIT.

In the batch processing environment 10, a component called the service component 20 (Common Services Framework, CSF) is provided. Its purpose is the dynamic provision of resources (temporary storage space, files with associated paths, etc.) for a batch processing run. An essential function of the service component 20 is to prepare a run time environment for the program which is indicated in the control instructions 14 and is to be called in a batch processing run. The service component 20 is represented in the embodiment shown in FIG. 1 as part of the control component 12. However, the service component 20 can also have functions outside the control component 12, and in particular outside the batch processing environment 10.

The service component 20 and control component 12 have access to a file register 22 (File Registrator, FR), a file definition component 24 (File Definition File, FDF) and the database 16 (DB). In the database 16, those files which are accessed during batch processing runs (and in particular during program runs) are stored. A physical file name is associated with each file in the database 16. In a database catalogue 26 (CAT), a physical storage location in the database 16 is in turn associated with each physical file name. The database catalogue 26 is managed via system functions which do not need to be considered further here.

The file register 22 communicates with the service component 20, and has access to the database 16 (and if required also to the database catalogue 26). The file register 22 contains individual register entries, in which at least one selection attribute is associated with each physical file name.

Program-related, abstract selection criteria are associated with the individual selection attributes of the register entries in the file register 22. The abstract selection criteria specify the files (data sets) which are required (e.g. to be read and/or written) during the running of a particular program, and are provided as file definition information by the file definition component 24. The file definition component 24 here is a file definition file (which may be stored in the database 16).

A physical file name can be associated with the file definition file in a DD record of the control instructions 14. In this way, in the control instructions 14, linking between a specified file definition file (via its physical file name) and a specified program which is indicated in the EXEC record of the control instructions 14, takes place (other association mechanisms would also be conceivable). On the basis of such a linkage, the service component 10 can determine the file definition information which is associated with the program to be called, and on the basis of the file definition information initiate the selection and/or creation of register entries in the file register 22.

The selection and/or creation of register entries in the file register 22 takes place separately from an access to and/or creation of corresponding physical files. To initiate the creation of empty files in advance of a program run, a file management component 21 is provided. By means of the file management component 21, paths to the selected and/or created files can also be opened in advance of the program run. According to FIG. 1, the file management component 21 is in communication with the service component 20 and database 16.

Below, an embodiment of a batch processing method is explained with reference to the flowchart 200 shown in FIG. 2. This method can be carried out under the control of a computer program product by means of the batch processing system 100 which is shown in FIG. 1, or by means of a differently configured system.

The method begins with a step 202, in which batch processing control instructions including the call of at least one program are prepared. Then, in a step 204, files which have physical file names and are accessed during batch processing runs are prepared. In a further step 206, program-related file definition information is prepared. The file definition information defines those files which are accessed (or at least expected to be accessed) during a program run. The file access during a program run includes at least one write access or at least one read access. The file definition information defines the files which are required during a program run, preferably in the form of abstract selection criteria.

In step 208, a file register in which the physical file names of the files which are created for program runs can be registered in the form of register entries is prepared. Usefully, register entries are created exclusively for those files which were actually accessed during a previous program run. In the file register, at least one selection attribute is associated with each register entry.

In a further step 210, register entries are selected and/or created on the basis of the file definition information which is associated with the program to be called. Each selection process is based on the selection criteria which are included therein. A new register entry can be created in such a way that in the file register at least one selection attribute is associated with a physical file name (depending on the selection criteria which are included in the corresponding file definition information). The sub-steps of selection and creation can be executed immediately one after the other or separated in time with reference to the program run. Thus the selection of register entries can be carried out in advance of a program run, whereas after the program run the selected register entries are updated and new register entries are created.

Figure 2:
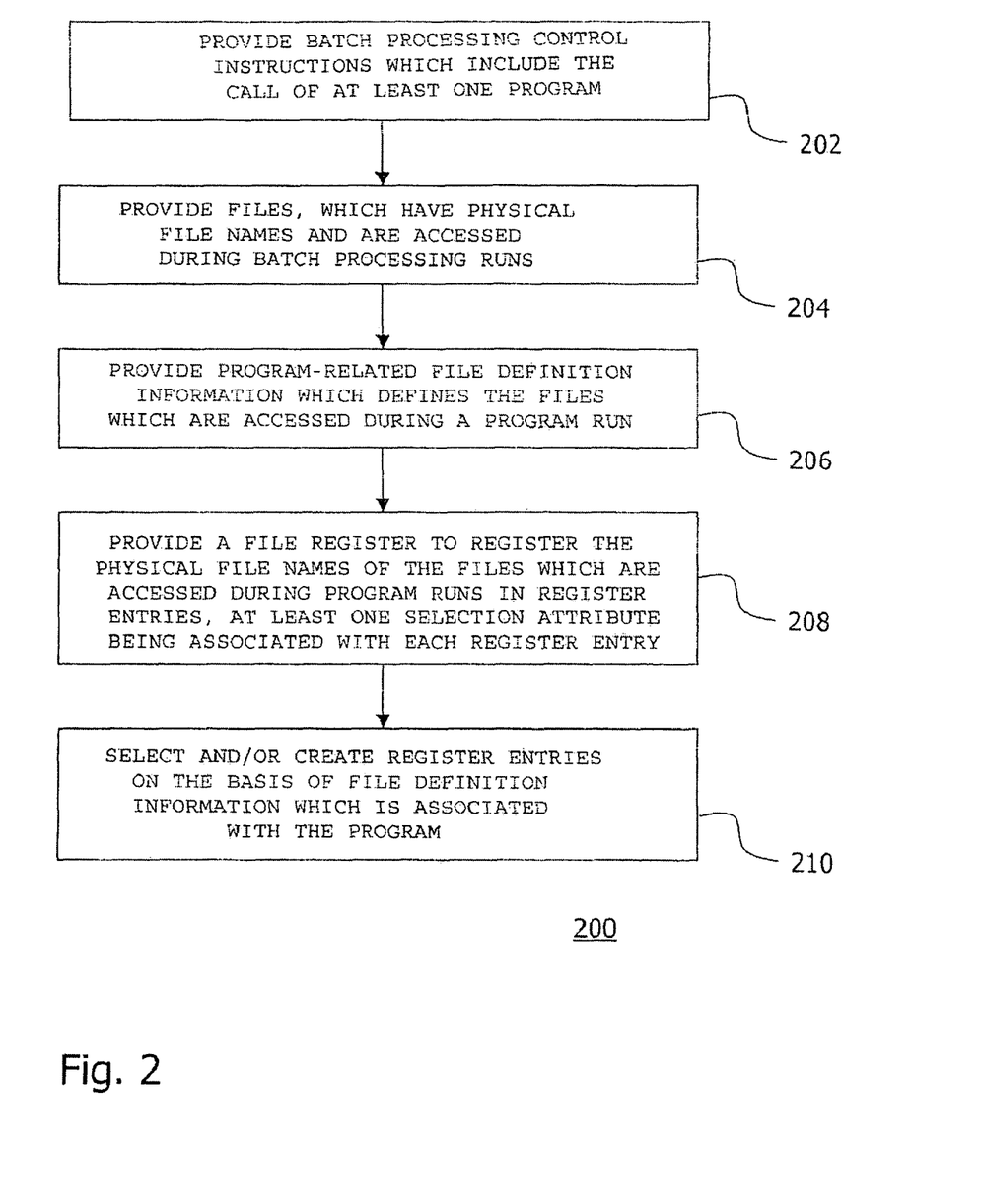
FIG. 2 shows a flowchart of an embodiment of the batch processing method according to the invention.

In further steps, not shown in FIG. 2, in particular following the selection of register entries on the basis of the information which is included in the selected register entries (e.g. on the basis of selected physical file names), a run time environment for the program to be called can be prepared. Additionally, in advance of step 210, at least one of the abstract selection criteria which are included in the file definition information can be concretised. Step 210 can then be carried out on the basis of the at least one concretised selection criterion.

Now, a detailed embodiment of a batch processing method is explained with reference to FIGS. 3 to 9. The explained method can be implemented by means of the batch processing system 100 shown in FIG. 1. For this reason, equivalent reference symbols are used for elements of the same kind.

Before the functions of the service component 20 are used, a run time environment for the service component 20 is created in the batch processing environment 10. The creation of the run time environment for the service component 20 is shown schematically in FIG. 3 and explained briefly below.

Figure 3:
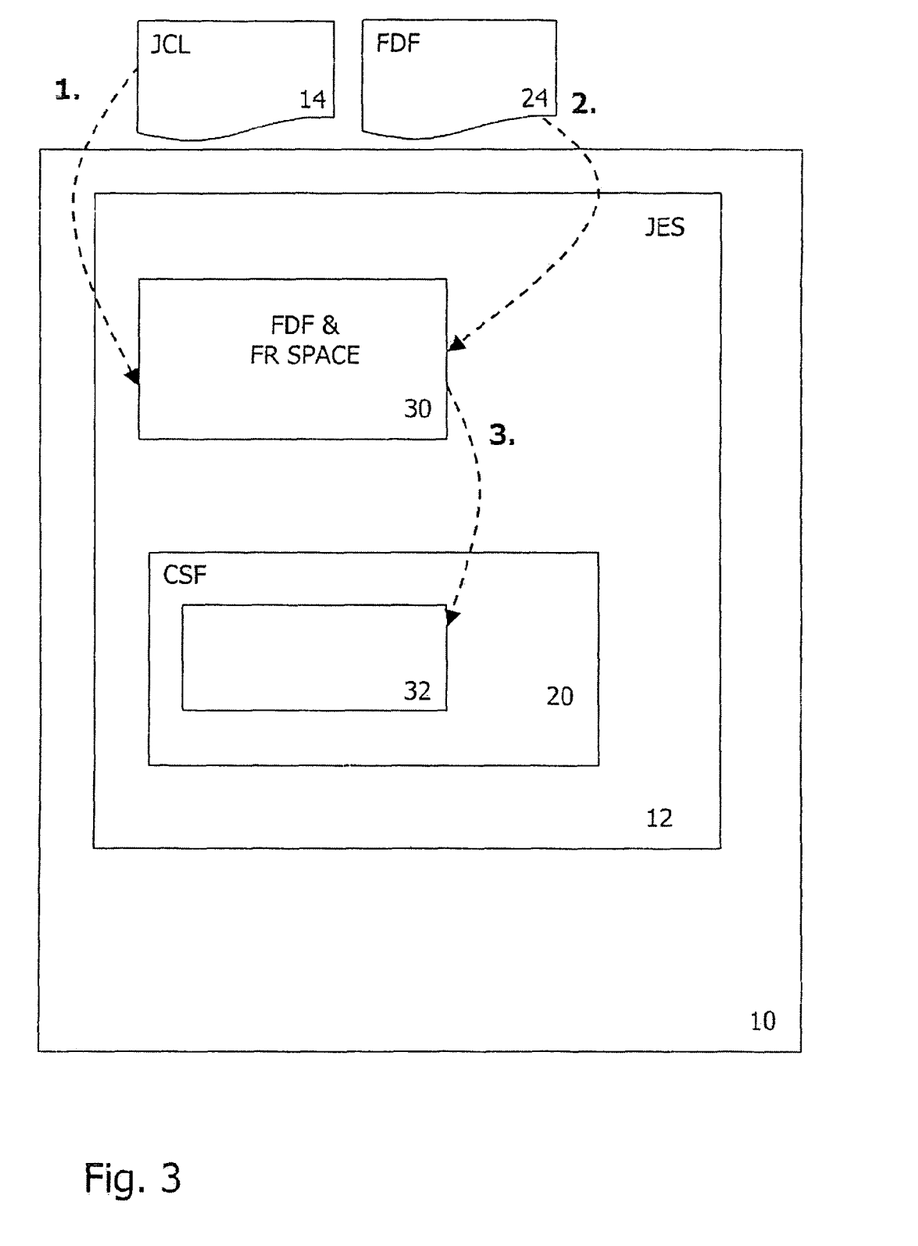
FIG. 3 shows a schematic representation of the preparation of a run time environment for the batch processing system according to FIG. 1.

If the batch processing control component 12 is instructed by the run control component 18 shown in FIG. 1 (or manually) to process the control instructions 14, the control component 12 first prepares a run time environment for the service component 20, in a first step shown in FIG. 3. For this purpose, storage space (not shown), into which the service component 20 can be loaded, is reserved in the batch processing environment. Additionally, storage space 30 is reserved for the file definition component 24 which the service component 20 is to read, and for file register entries. Storage space 30 for the file definition component 24 is reserved on the basis of control instructions 14, which assign a physical file name (DD record) to the file definition component 24 to be loaded.

After the control component 12 has reserved storage space for the file definition component 24, register entries and the service component 20, under control of the control instructions 14 the service component 20 is loaded and called. The service component 20 then, in a second step shown in FIG. 3, loads the file definition component (data set) of which the physical file name is given in the control instructions 14 into the reserved storage space 30.

Then, on the basis of the contents of the loaded file definition component 24 and further information, which is partly obtained from outside the run time environment 10 (e.g. from the run control component), in a third step a run time environment 32 is prepared for the (application) program which is indicated in the control instructions 14 and which is to be loaded. The preparation of this run time environment is shown schematically in FIG. 4.

Figure 4:
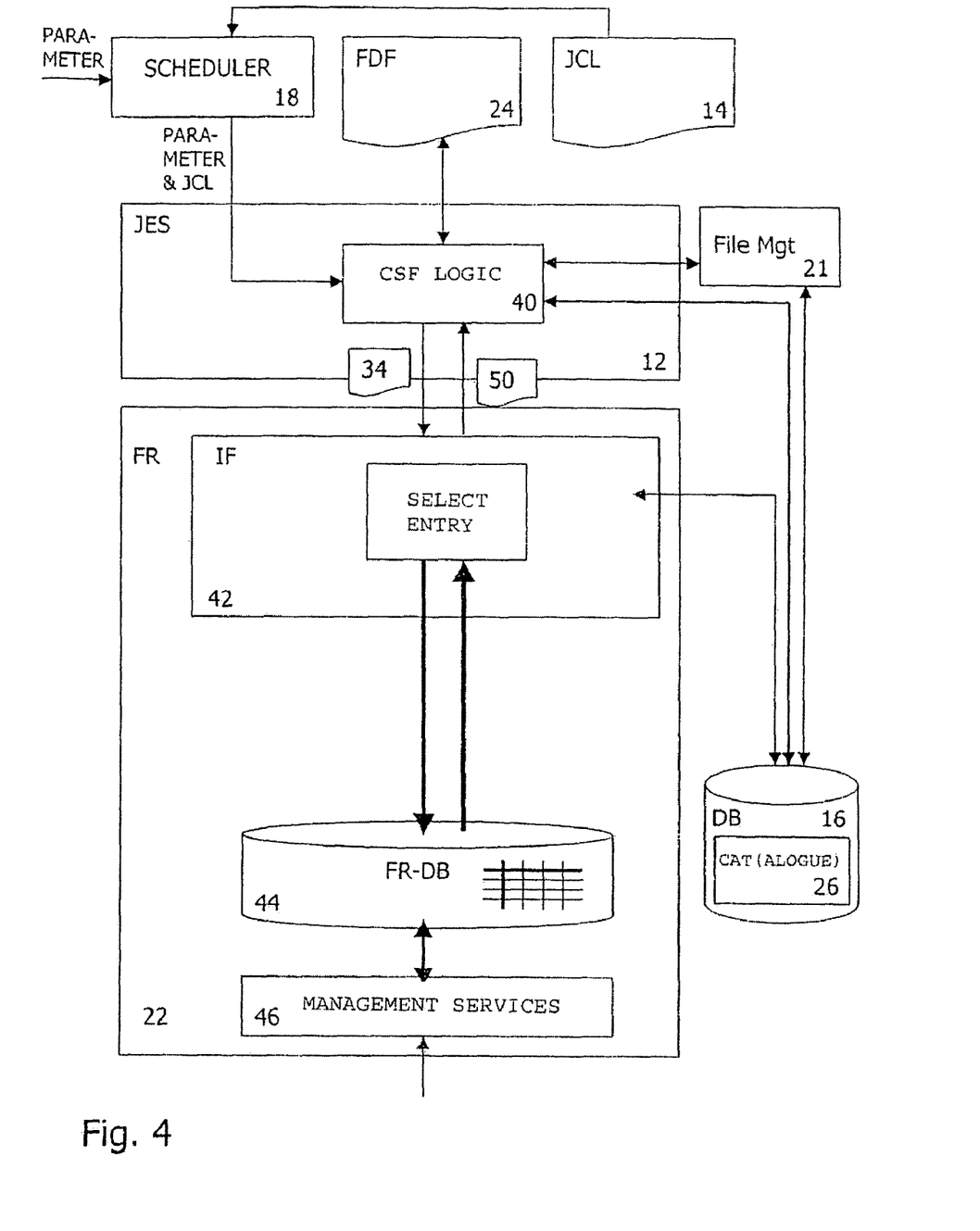
FIG. 4 shows a schematic representation of the selection of register entries in the file register, in association with the preparation of a run time environment.

As can be seen in FIG. 4, the service component 20 has control logic 40. The control logic 40 initiates the preparation of a run time environment for the program to be called, as is described in more detail below.

First, the run control component 18 passes the control instructions 14 and a specified parameter set to the control component 12. The control component 12 loads the file definition component 24 which is associated with the program to be called in the control instructions 14 into the reserved storage space (reference symbol 30 in FIG. 3). The content of the loaded file definition component 24 is then concretised on the basis of the passed parameter, and finally analysed. The aim of this analysis is to identify the files which the program to be called requires.

Figure 6:
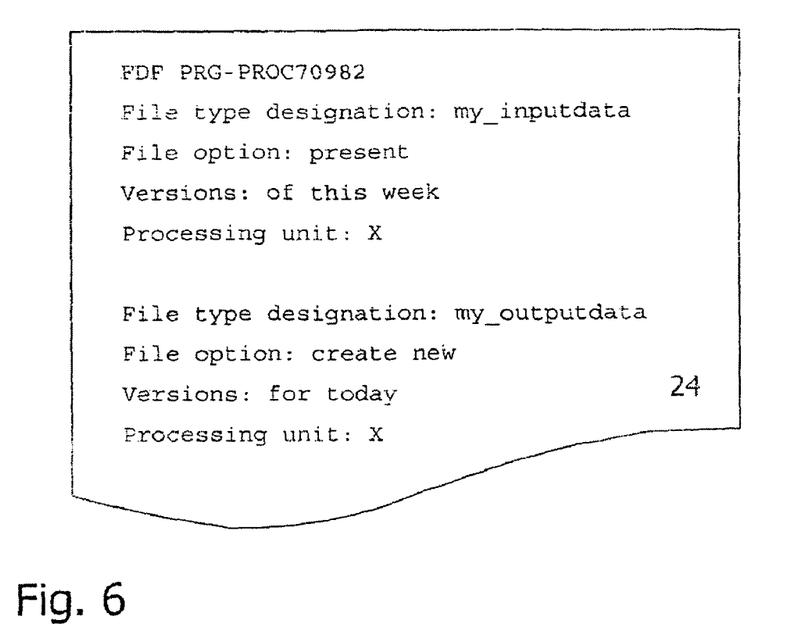
FIG. 6 shows a schematic representation of a file definition component and the abstract file definition information which it contains.

As an example, FIG. 6 shows a file definition component 24 which is loaded by the control component 12. The file definition component 24 contains the file definition information for the program which is specified in an EXEC record of the control instructions 14, and called "PRG-PROC70982" in the example. The file definition information defines the files which are required during a run of this program by abstract (non-physical) selection criteria, and other selection criteria if required. In the embodiment, the abstract selection criteria are the criteria "versions" and "processing unit". In the case shown in FIG. 6, it is assumed that the program accesses two different file types. A first file type called my_inputdata is read by the program, and a second file type called my_outputdata is written by the program. The abstract selection criterion "versions" states, for the file type called my_inputdata, that all versions of this file type which were created in the current week are read by the program. Additionally, in the relevant batch processing run, only those file types which are associated with a particular, abstractly indicated (i.e. not explicitly specified in the file definition information) processing unit should be read. As far as the second file type my_outputdata which the program to be called requires is concerned, the file definition information specifies abstractly that for the relevant processing unit, a current file version (new file) with today's date should be created.

After the file definition information which has been explained with reference to FIG. 6 is read, in a next step the abstract selection criteria (versions, processing unit) which are included therein are concretised. These selection criteria are concretised by means of the parameter set which was passed by the run control component 18 (or manually) to the control component. In the example, the concretising parameters can be the current date (e.g. 13.12.2004) and the number of a specified processing unit (e.g. 03). Assuming that in the current week, for the file type called my_inputdata, file versions for 11.12.2004 and 12.12.2004 exist, and that a new file for the file type called my_outputdata is to be created for 13.12.2004, the concretised selection parameters for the file definition component 24 shown in FIG. 5 appear as shown in FIG. 7.

It should be pointed out that the file type designations according to FIG. 6 also represent an abstract (non-physical) selection criterion, since no physical file names have (yet) been assigned to the file type designations. Instead, physical file names are assigned using the file register 22, as is explained in more detail below. It should also be pointed out that in the file definition information, for each file type there is an indication of whether the corresponding file which the program requires already exists in the database 16 or must be newly created by the file management component 21 before the program is called.

Figure 7:
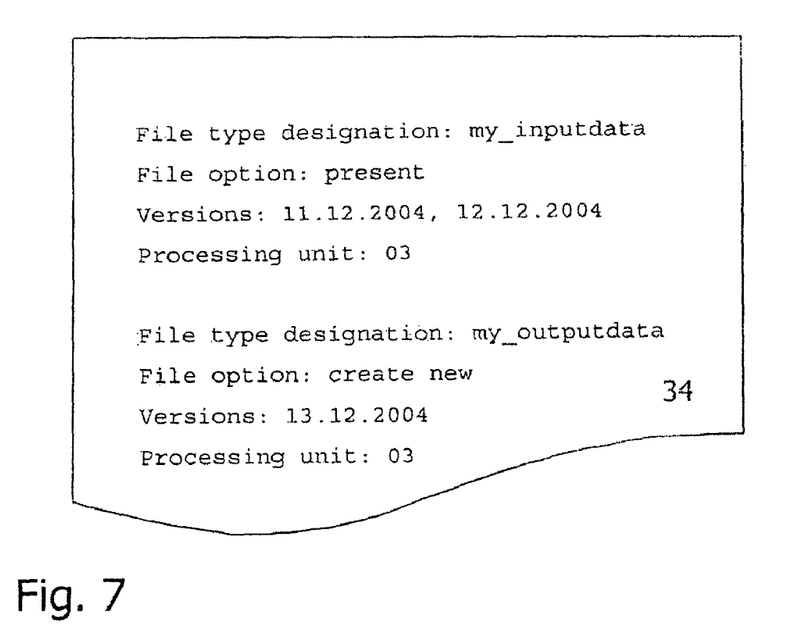
FIG. 7 shows a schematic representation of concretised file definition information.

The partly concretised selection criteria shown in FIG. 7 are passed to the file register 22 in the form of a single list 34 (see FIG. 4) or sequentially. An interface component 42 of the file register 22 receives the selection criteria 34 and analyses them with the help of a file register database 44. In this database 44, the physical file names of those files which were accessed in the context of earlier batch processing runs (i.e. earlier program runs) are registered. The physical file names are registered, as shown in FIG. 8, in the form of individual register entries.

Figure 8:
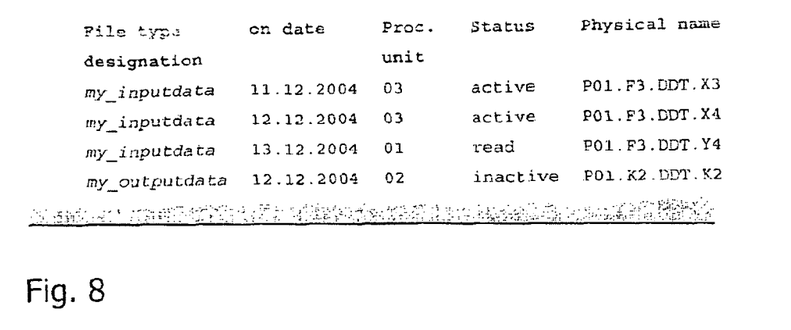
FIGS. 8 and 9 show schematic representations of register entries of a file register.

As an example, in FIG. 8 four register entries are shown, each register entry corresponding to a single physical file with a physical file name. Multiple selection attributes are associated with each register entry. A first selection attribute indicates a particular file type designation. A second selection attribute is a file version attribute in the form of a time stamp. The time stamp indicates the day on which a particular file was created or updated ("on date" or "per date"). A third selection attribute identifies the processing unit for which a particular file was created. A fourth selection attribute is a file status attribute, which indicates the activity status of a particular file and makes it possible to find files which are no longer required (particularly files which have already been read).

The various selection attributes are now explained in more detail for the first register entry of the table shown in FIG. 8. According to this first register entry, the file with the physical name P01.F3.DDT.X3 is a file of file type my_inputdata, and was generated on 11th Dec. 2004 for processing unit 03. The file is marked with the status attribute "active".

Figure 5:
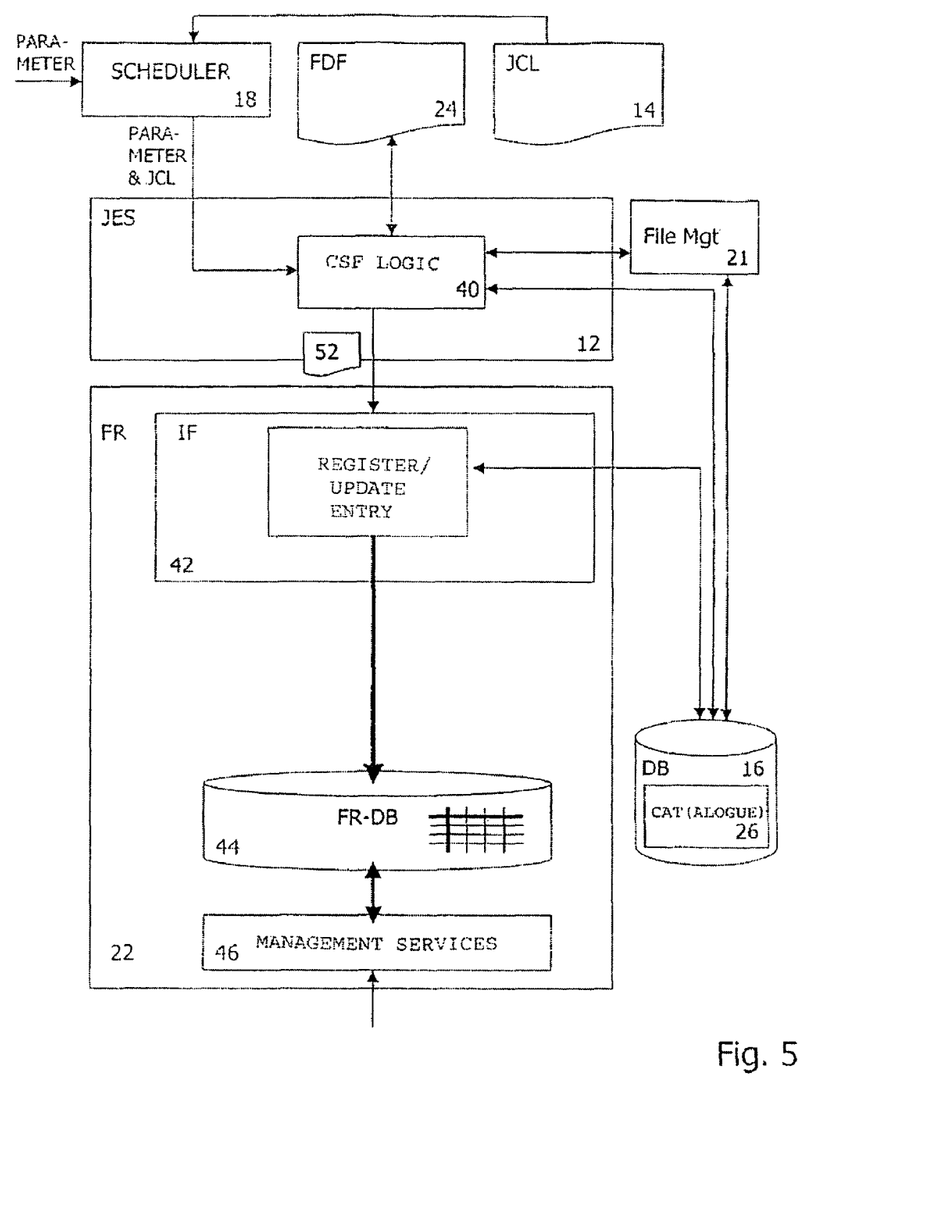
FIG. 5 shows a schematic representation of the registration of newly created and written files in the file register.

With that said, the method of functioning of the interface component 42 according to FIG. 4 can now be explained. The interface component 42 has two different functions, on the one hand a function to select one or more existing entries (FIG. 4), and on the other hand a function to register a new entry (i.e. create a new entry as shown in FIG. 5). The selection of existing register entries will be explained first, on the basis of FIG. 4.

In analysing the concretised file definition information in the list 34 according to FIG. 7, the interface component 42 establishes that two versions of the file type called my_inputdata for processing unit 03 should be read, i.e. the two file versions for 11.12.2004 and 12.12.2004. The interface component 42 selects, on the basis of these selection criteria, those entries which agree with these selection criteria in the file register database 44. These are the first two entries in the table according to FIG. 8. The interface component 42 reads the two entries and passes them back to the control component 12 in the form of a list (or sequentially).

As far as the file type called my_outputdata is concerned, the CSF logic 40 establishes that a file is to be newly created and written, as a file version with today's date (13.12.2004) and for the processing unit 03. The CSF logic then causes the file management component 21 to create a new empty file in the database 16, and a new physical file name is allocated, and also entered in the database catalogue 26 (together with the physical storage location).

The control component 12 then reserves storage areas for all files which are listed in the list 50 which the interface component 42 maintains, or which have been newly created by the file management component 21. It should be pointed out that the control component 12 now also knows, from the list 50 or the management component 21, the physical file names of the files which are addressed during the program run, and can thus open paths to the files which the program requires (i.e. the selected and newly created files). The control component 12 can delegate the task of opening paths to the files which the program requires to the management component 21. As the last step of run time preparation, the service component 12 reserves storage space for the program to be called, and finally loads and calls the program which is defined in the control instructions 14 into the storage area which is reserved for this purpose.

After the program ends, the CSF logic 40 checks, on the basis of the file definition information 24, to what extent entries in the file register database 44 must be newly created or updated. As shown in FIG. 5, the corresponding information must be communicated in the form of a list 52 or sequentially to the interface component 42 of the file register 22. The interface component 42 analyses the received information and creates new register entries on the basis of the received information, or updates existing register entries.

Figure 9:
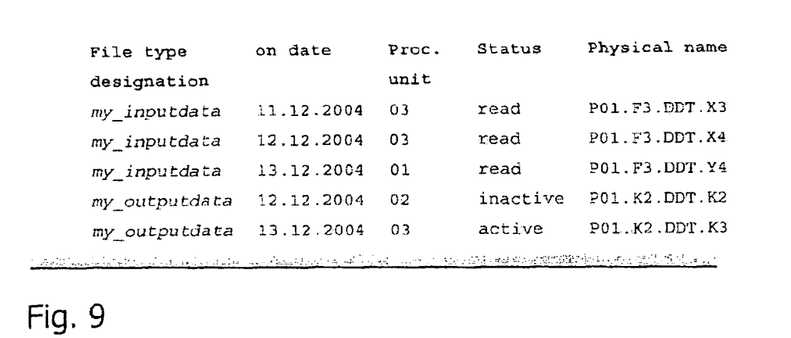

This process is illustrated below on the basis of the example which is explained with reference to FIGS. 6 to 8. After the program ends, the CSF logic 40 checks, on the basis of the file definition information 24, the file accesses which have occurred while the program was running. In this way, the CSF logic establishes that the program read two files with the file type designation my_inputdata for the processing unit 03. Accordingly, the list 52 which is passed to the interface component 42 includes the instruction to change the status of these two files from "active" to "read" (see FIG. 9). The CSF logic also establishes that a file with the file type designation my_outputdata for the processing unit 03 with the "on date" 13.12.2004 was newly created and actually written by the program. Accordingly, the list 52 includes the instruction to create a corresponding new register entry (as shown in FIG. 9) with the corresponding selection attributes and the corresponding physical file name.

If the CSF logic 40 establishes that before the program run the file management component 21 did create a new (empty) file, but the file was not written during the program run, no reference to the newly created file is added to the list 52. Accordingly, the interface component 42 also does not create a new register entry for this empty file which is not required. Such (not required) empty files can be found and deleted within a purging process. To find empty files which are not required, there is a check for which of the files which are created in the database 16 no corresponding register entry in the file register database 44 exists. Such files are then deleted.

Since according to the above explanations the physical file names of the files which the program requires do not have to be defined in the control instructions 14, the batch processing runs can be in a significantly more flexible form. In the embodiments, physical file names are associated with program-specific file types dynamically, using the file register. The file register makes file versioning possible in an advantageous way, without the necessity of using traditional GDGs. Additionally, the flexible allocation of concrete (absolute) version attributes in the file register, such as "on date", makes problem-free restarting possible if the system crashes. In particular, if the version attributes and corresponding selection criteria are used, the relative references of GDGs can be avoided.

A further advantage of the file register is that a file status attribute can be allocated to each physical file. The file status attribute makes it possible to distinguish and manage the individual files. In particular, in this way files which are inactive or have been read can be reliably found and removed. File and status manipulations can be carried out by the interface component 42 or by additional management services 46, as shown in FIG. 4. The management services 46 can be called from outside the file register (and outside the batch processing environment). Preferably, the management services 46 are called periodically, to delete inactive or read files at regular intervals.

The management services 46 can also be used to identify files which are no longer required (read) on the basis of the entries in the file register database 44, to cause them to be deleted from the database 16. Obviously, such a purging step can also be based on one or more other or further selection attributes. It is thus possible to think of identifying, on the basis of the register entries, all files which were generated before a specified key date and should be deleted.

It will be apparent to one of ordinary skill in the art that numerous modifications and substitutions may be made without departing from the spirit of the invention. Accordingly, the invention has been described by way of illustration rather than limitation, and is limited only by the appended claims.

The invention claimed is:

1. A method of batch processing implemented on a computer, the method comprising:
   providing batch processing control instructions comprising computer executable instructions stored in a memory configured to call at least one program comprising computer executable instructions, wherein the control instructions are processed during a batch processing run;
   providing data files stored in the memory, wherein each of the data files has a physical file name and the data files are accessed during batch processing runs;
   providing program-related file definition information, which defines, by abstract selection criteria, a subset of the data files which are accessed during a program run, wherein at a start of a batch processing run, at least one parameter is passed to a batch processing control component, wherein the at least one parameter defines at least one selection attribute in accordance with the defined abstract selection criteria which are included in the file definition information;
   registering and associating each of the physical file names of the subset of the data files which are accessed during program runs with the at least one selection attribute in a form of register entries in a file register stored in the memory;
   performing at least one of a selection and creation of register entries in the file register stored in the memory on the basis of the at least one parameter; and
   passing a given physical file name of a selected or created registry entry from the file register to at least one service component.

2. The method according to claim 1, wherein on a basis of the selected register entries, a run time environment is prepared for the program to be called.

3. The method according to claim 2, wherein preparation of the run time environment includes preparation of paths for the subset of the data files which the program requires.

4. The method according to claim 1, wherein after the program run, new register entries are created and/or selected register entries are updated.

5. The method according to claim 1, wherein the file definition information is contained in an information file stored in the memory which is defined in the batch processing control instructions.

6. The method according to claim 1, wherein the abstract selection criteria which are contained in the file definition information refer to at least one non-physical parameter.

7. The method according to claim 1, wherein the file definition information is held separately from the control instructions.

8. The method according to claim 1, wherein the program is an application program, and the control instructions are free of assignments of physical file names for the subset of the data files which are required when the application program runs.

9. The method according to claims 1, wherein the at least one selection attribute includes a file version attribute.

10. The method according to claim 9, wherein the file version attribute is a time stamp.

11. The method according to claim 1, wherein the at least one selection attribute indicates a program-specific file type.

12. The method according to claim 1, wherein the at least one selection attribute includes a file status attribute.

13. The method according to claim 12, wherein the file status attribute identifies the activity status of a given file of the subset of the data files.

14. The method according to claim 12, wherein the file status attribute of a given file of the subset of the data files which was accessed during a program run is allocated or updated after the program run.

15. The method according to claim 12, wherein on the basis of the file status attribute, housekeeping of the subset of the data files occurs.

16. A computer storage having computer executable instructions for performing a method, the method comprising:

providing batch processing control instructions comprising computer executable instructions stored in a memory configured to call at least one program comprising computer executable instructions, wherein the control instructions are processed during a batch processing run;

providing data files stored in the memory, wherein each of the data files has a physical file name and the data files are accessed during batch processing runs;

providing program-related file definition information, which defines, by abstract selection criteria, a subset of the data files which are accessed during a program run, wherein at a start of a batch processing run, at least one parameter is passed to a batch processing control component, wherein the at least one parameter defines at least one selection attribute in accordance with the defined abstract selection criteria which are included in the file definition information;

registering and associating each of the physical file names of the subset of the data files which are accessed during program runs with the at least one selection attribute in a form of register entries in a file register stored in the memory;

performing at least one of a selection and creation of register entries in the file register stored in the memory on the basis of the at least one parameter; and passing a given physical file name of a selected or created registry entry from the file register to at least one service component.

17. A batch processing system, comprising:
a memory for storing computer executable instructions;
a plurality of data files stored in the memory, wherein each of the plurality of data files has a physical file name and wherein the plurality of data files are accessed during batch processing runs;
a processing unit for accessing the memory and executing the computer executable instructions, the computer executable instructions comprising:
a batch processing control component configured to process batch processing control instructions configured to call at least one program;
a file definition component configured to provide program-related file definition information, which defines, by abstract selection criteria, a subset of the data files which are required for a program run, wherein at a start of a batch processing run, at least one parameter is passed to the batch processing control component, wherein the at least one parameter defines at least one selection attribute in accordance with the defined abstract selection criteria which are included in the file definition information;
a file register configured to register and associate each of the physical file names of the subset of the data files which are accessed during program runs with the at least one selection attribute, the at least one selection attribute being associated with each physical file name in register entries of the file register;
a service component which communicates with the batch processing control component, and which has access to the file register and the file definition component, the service component initiating at least one of selection and creation of register entries on the basis of the at least one parameter; and
a run control component configured to:
start the batch processing runs;
hand over the at least one parameter to the service component; and
pass a given physical file name of a selected or created registry entry from the file register to the at least one service component.

18. The system according to claim 17, wherein the physical file names which are included in the selected or newly created register entries are accessible to the service component.

19. The system according to claim 17, wherein the service component prepares a run time environment for the program to be called, on a basis of the selected or newly created register entries.

20. The system according to claim 17, wherein the file register is organised in a database.

* * * * *